(12) United States Patent
Mizuno

(10) Patent No.: US 7,195,282 B2
(45) Date of Patent: Mar. 27, 2007

(54) MOTOR VEHICLE

(75) Inventor: Minobu Mizuno, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 49 days.

(21) Appl. No.: 11/095,501

(22) Filed: Apr. 1, 2005

(65) Prior Publication Data
US 2005/0224265 A1 Oct. 13, 2005

Related U.S. Application Data

(63) Continuation of application No. PCT/JP03/09095, filed on Jul. 17, 2003, now abandoned.

(30) Foreign Application Priority Data
Oct. 3, 2002 (JP) ............................. 2002-290952

(51) Int. Cl.
*B60K 15/03* (2006.01)
(52) U.S. Cl. ...................................... 280/830; 220/562
(58) Field of Classification Search ................ 280/830, 280/834, 838, 784, 69.4, 65.2, 65.3; 220/562, 220/88.1; 180/69.4, 65.2, 65.3
See application file for complete search history.

(56) References Cited

U.S. PATENT DOCUMENTS

| | | | |
|---|---|---|---|
| 5,193,635 A | | 3/1993 | Mizuno et al. |
| 6,378,637 B1 * | | 4/2002 | Ono et al. ................. 180/65.3 |
| 6,692,028 B2 * | | 2/2004 | Koster ....................... 280/830 |
| 6,874,588 B2 * | | 4/2005 | Kato et al. ................. 180/65.3 |
| 6,953,099 B2 * | | 10/2005 | Kawasaki et al. ......... 180/65.1 |
| 6,983,945 B2 * | | 1/2006 | Kawasaki et al. .......... 280/834 |
| 2002/0121772 A1 * | | 9/2002 | Koster ........................ 280/830 |
| 2003/0148168 A1 * | | 8/2003 | Enjoji et al. .................. 429/38 |

(Continued)

FOREIGN PATENT DOCUMENTS

EP 1 115 165 A2 7/2001

(Continued)

OTHER PUBLICATIONS

Chinese Language Version of Chinese Office Action for Application No. 03823458.0, issued Mar. 31, 2006.

(Continued)

*Primary Examiner*—J. Allen Shriver
(74) *Attorney, Agent, or Firm*—Kenyon & Kenyon LLP

(57) ABSTRACT

Hydrogen tanks 21 are located in the vicinity of a front axle of a left front wheel FWL and a right front wheel FWR in a front space 61 of a motor vehicle and are arranged to have their longitudinal axis along a width of the vehicle. The hydrogen tanks 21 are positioned at a height substantially the same as a mounting height of a front bumper 64. This layout desirably ensures sufficient spaces in a trunk room 62 on the rear side of the vehicle and in a passenger compartment of the vehicle. This layout also enables the load of the hydrogen tanks 21 to be directly applied to the left and right front wheels FWL and FWR, while ensuring the good weight balance over the width of the vehicle. The positioning of the hydrogen tanks 21 at substantially the same height as the mounting height of the front bumper 64 effectively reduces a potential shock to the hydrogen tanks 21 in the event of a vehicle collision.

19 Claims, 3 Drawing Sheets

U.S. PATENT DOCUMENTS

2004/0086759 A1* 5/2004 Parchamazad ............... 429/26
2004/0094340 A1* 5/2004 Kawasaki et al. ......... 180/65.1

FOREIGN PATENT DOCUMENTS

| | | |
|---|---|---|
| JP | 03-109126 | 5/1991 |
| JP | 03-109126 | 9/1991 |
| JP | 05-310052 | 11/1993 |
| JP | 06-293224 | 10/1994 |
| JP | 2001-063386 | 3/2001 |
| JP | 2001-253248 | 9/2001 |
| JP | 2001-294048 | 10/2001 |
| JP | 2002-222658 | 8/2002 |
| JP | 2002-240746 | 8/2002 |
| JP | 2002-248949 | 9/2002 |

OTHER PUBLICATIONS

English Translation of Chinese Office Action for Application No. 03823458.0, issued Mar. 31, 2006.

Japanese Office Action for Appln. No. JP2002-290952 dated Dec. 5, 2006.

Partial Translation of Japanese Office Action for Appln. No. JP2002-290952 dated Dec. 5, 2006.

* cited by examiner

MOTOR VEHICLE

CROSS-REFERENCE TO RELATED APPLICATION

This is a continuation of Application PCT/JP03/09095, filed Jul. 17, 2003, now abandoned.

BACKGROUND OF THE INVENTION

1. Field of the Invention

The present invention relates to a motor vehicle.

2. Description of the Prior Art

In one proposed layout of a motor vehicle, fuel cells are located in the vicinity of either a front axle or a rear axle, while fuel tanks for supplying a fuel to the fuel cells are located under the floor of a passenger compartment to be positioned near to the fuel cells (see, for example, Japanese Patent Laid-Open Gazette No. 2001-253248). This proposed layout of the motor vehicle ensures the supply of hydrogen to the fuel cells without occupying the space of the passenger compartment and an available storage capacity of the vehicle.

The increased volume of the fuel tanks located under the floor of the passenger compartment, however, naturally takes some space of the passenger compartment. The demand of increasing the volume of the fuel tanks is thus rather contradictory to the demand of ensuring the sufficient space of the passenger compartment. The fuel tanks may be located in a trunk room on the rear side of the vehicle, as is often found in cabs. This layout, however, undesirably limits the space of the trunk room.

SUMMARY OF THE INVENTION

The motor vehicle of the invention thus aims to ensure sufficient spaces in a passenger compartment and in a trunk room on the rear side of the vehicle. The motor vehicle of the invention also aims to have a favorable loading balance over the vehicle.

In order to attain at least part of the above and the other related objects, the present invention of the motor vehicle is structured as follows.

A motor vehicle of the invention is directed to a motor vehicle, which includes: a power output apparatus that receives a supply of gaseous fuel and outputs driving power; and a fuel tank that is located in a neighborhood of a front axle of the vehicle and stores the gaseous fuel to be supplied to the power output apparatus.

In the motor vehicle of the invention, the fuel tank is located in the vicinity of the front axle and stores the gaseous fuel to be supplied to the power output apparatus, which receives the supply of gaseous fuel and outputs driving power. This layout does not occupy the spaces of a passenger compartment and a trunk room on the rear side of the vehicle and thus ensures the sufficient spaces in the passenger compartment and in the trunk room on the rear side of the vehicle. The arrangement of the fuel tank in the vicinity of the axle enables the load of the fuel tank to be directly applied to the axle and thereby desirably reduces the required weight of a support member for supporting the fuel tank. The 'fuel tank' may store hydrogen or a hydrogen-containing gas as the gaseous fuel.

In one preferable embodiment of the invention, the motor vehicle has a shock absorbing member that is mounted on a foremost part of the vehicle to absorb impact of a front collision, and the fuel tank is located to partly overlap a mounting height of the shock absorbing member. This arrangement desirably reduces a potential shock to the fuel tank in the event of a vehicle collision.

In the motor vehicle of the invention, it is preferable that the fuel tank is arranged to have its longitudinal axis along a width of the vehicle. This arrangement ensures the good loading balance over the width of the vehicle.

In the motor vehicle of the invention, it is preferable that the power output apparatus includes fuel cells that receive the supply of gaseous fuel and generate electric power. In this case, the structure of the invention is actualized by the layout of the fuel tank in a fuel cell vehicle.

In the fuel cell vehicle according to the structure of the invention, the fuel cells may be located in the passenger compartment. This arrangement desirably reduces potential effects due to the contact of the fuel cells with the outside air. The fuel cells may be located under a seat or more specifically may be located under a front seat or under a rear seat to be stacked along the width of the vehicle. This arrangement ensures the effective use of a potentially dead space in the passenger compartment and gives the good loading balance over the width of the vehicle.

In the fuel cell vehicle according to the structure of the invention, the power output apparatus may further include an accumulator that is chargeable with the electric power generated by the fuel cells. In this embodiment, the accumulator may be located under the seat.

DESCRIPTION OF THE PREFERRED EMBODIMENTS

Figure 1:
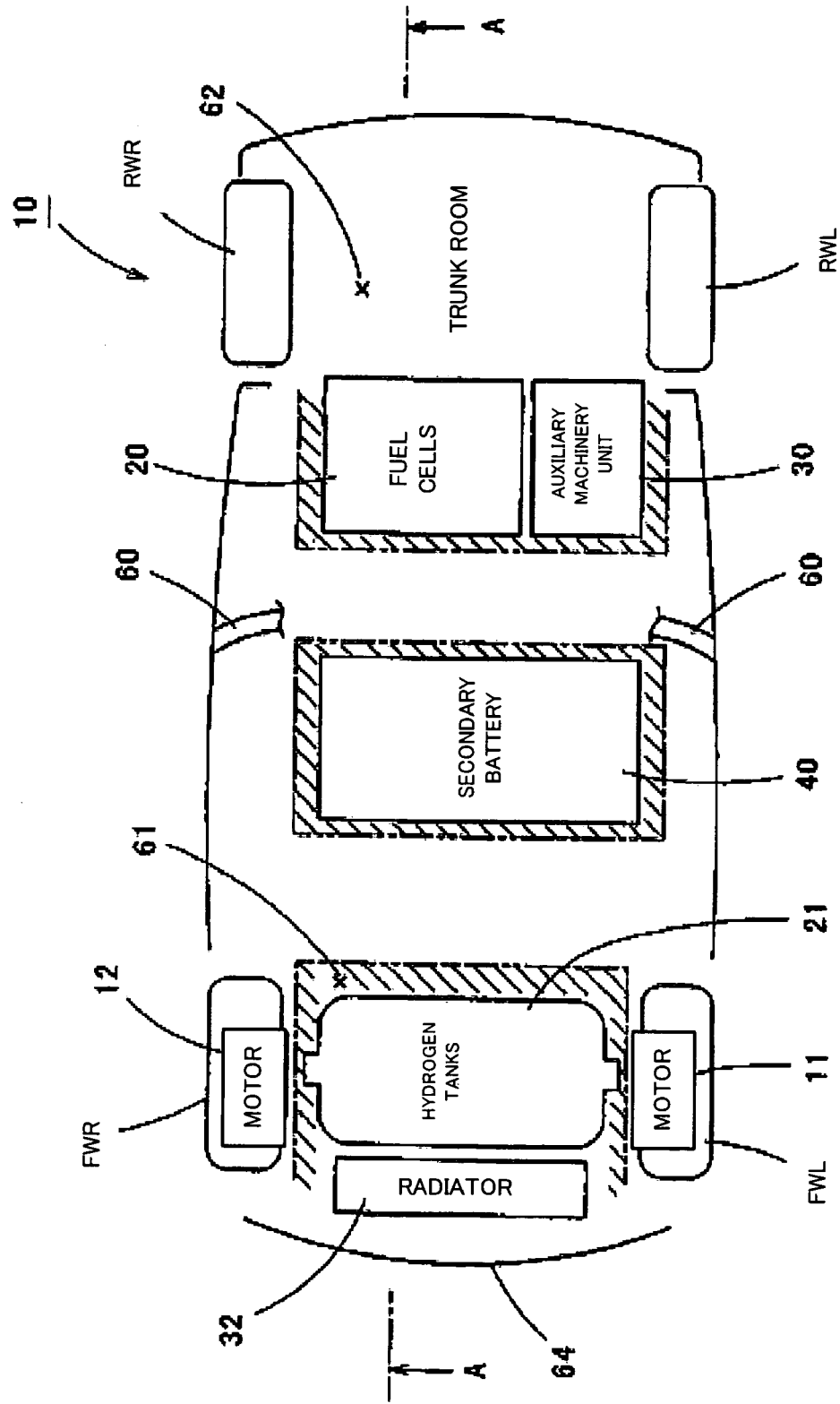
FIG. 1 is a plan view schematically illustrating the configuration of a fuel cell vehicle 10 in one embodiment of the invention.
Figure 2:
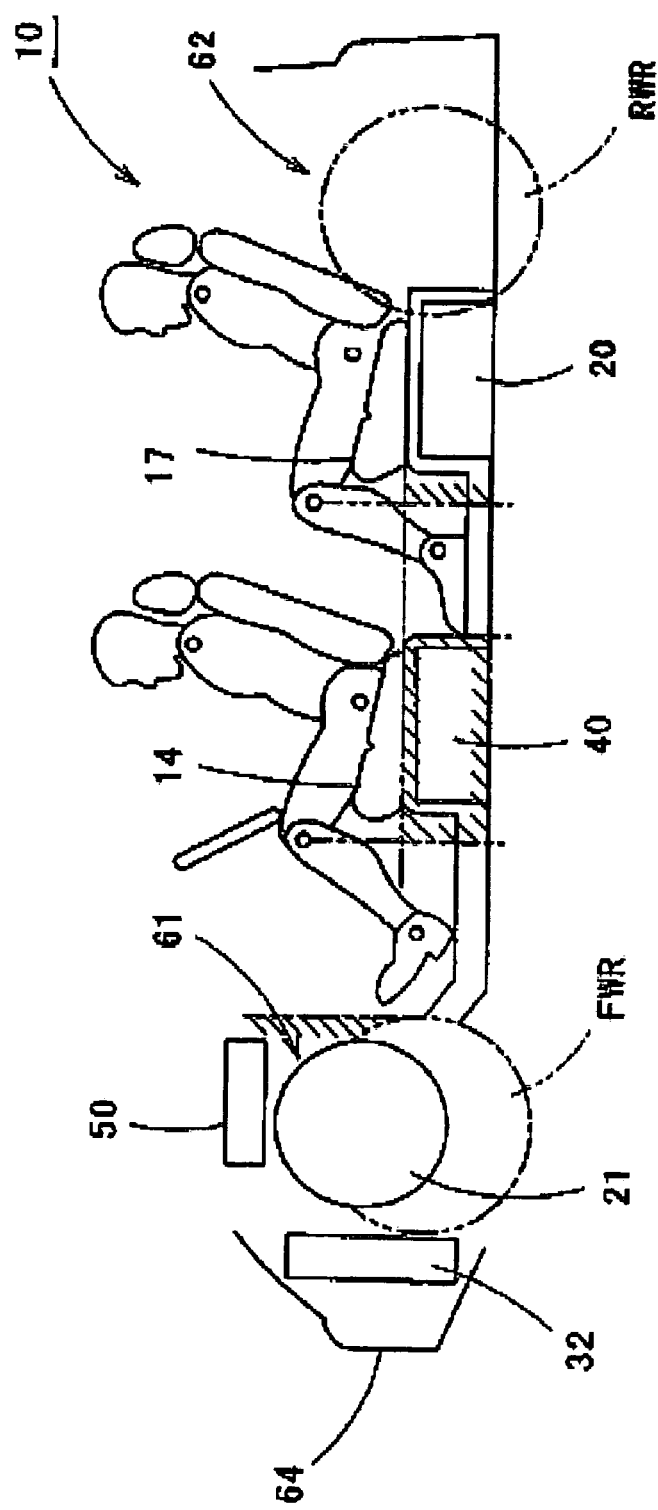
FIG. 2 is a sectional view showing the fuel cell vehicle 10 of the embodiment, taken on a line A—A of FIG. 1.
Figure 3:
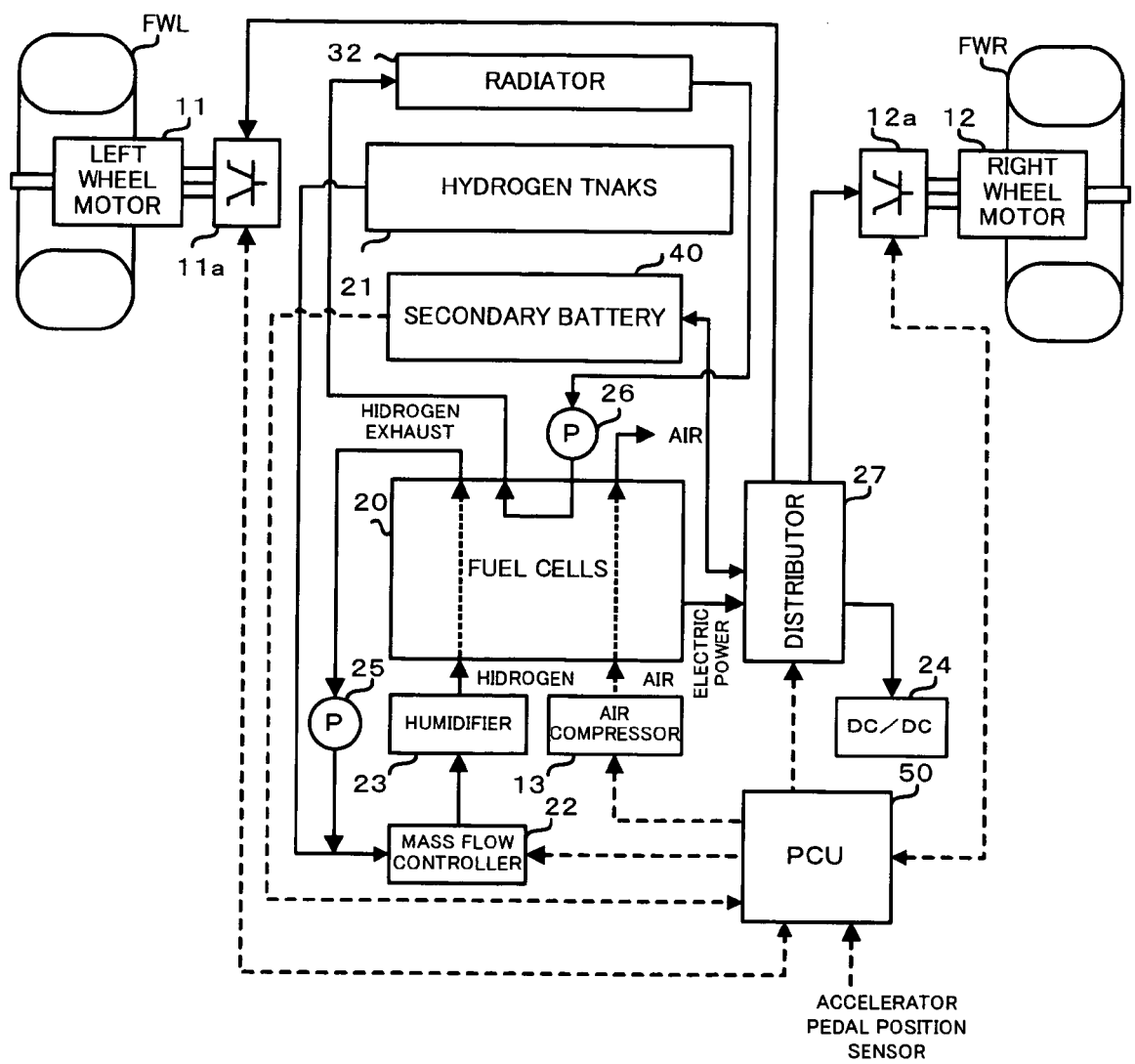
FIG. 3 is a block diagram showing functional blocks of the fuel cell vehicle 10 of the embodiment.

One mode of carrying out the invention is discussed below as a preferred embodiment. FIG. 1 is a plan view schematically illustrating the configuration of a fuel cell vehicle 10 in one embodiment of the invention. FIG. 2 is a sectional view showing the fuel cell vehicle 10 of the embodiment, taken on a line A—A of FIG. 1. FIG. 3 is a block diagram showing functional blocks of the fuel cell vehicle 10 of the embodiment.

As illustrated, the fuel cell vehicle 10 of the embodiment includes a left wheel motor 11 that is built in a left front wheel FWL, a right wheel motor 12 that is built in a right front wheel FWR, a secondary battery 40 that is located under a front seat 14, fuel cells 20 and an auxiliary machinery unit 30 that are located under a rear seat 17, hydrogen tanks 21 that are located in a front section of the vehicle and store hydrogen therein to be supplied to the fuel cells 20, a radiator 32 that radiates heat of cooling water running through the fuel cells 20, and a power control unit (hereafter referred to as PCU) 50 that controls the whole driving system of the vehicle.

The left wheel motor 11 and the right wheel motor 12 are, for example, three-phase synchronous motor generators and are respectively built in the left front wheel FWL and the right front wheel FWR as in-wheel motors. The outputs of the DC current from the fuel cells 20 and the secondary battery 40 are distributed by a distributor 27, are converted into three-phase AC current by inverters 11a and 12a, and are supplied to the left wheel motor 11 and the right wheel motor 12 as shown in FIG. 3. The left wheel motor 11 and the right wheel motor 12 receive the supplies of the three-phase AC current and output the rotational driving force to the left front wheel FWL and to the right front wheel FWR to drive the fuel cell vehicle 10. A left rear wheel RWL and a right rear wheel RWR are driven wheels.

The front seat 14 is a seat in a front row out of two rows of seats provided in a passenger compartment and includes a driver's seat and a front passenger's seat. The rear seat 17 is a bench seat in a rear row out of the two rows of seats. Center pillars 60, 60 are formed upright on a left side face and a right side face to be located between the front seat 14 and the rear seat 17 in the fuel cell vehicle 10.

The fuel cells 20 are known polymer electrolyte fuel cells and form a stack structure including a large number of unit cells. As shown in FIG. 3, in each unit of the fuel cells 20, an anode receives a supply of hydrogen gas (fuel gas), which is fed from the hydrogen tanks 21, goes through a mass flow controller 22 for pressure and flow rate control, and is humidified by a humidifier 23, while a cathode receives a supply of pressure-regulated, compressed air (oxidizing gas) from an air compressor 13. The fuel cells 20 produce an electromotive force through electrochemical reaction of the hydrogen gas with the compressed air. Hydrogen is separated into proton and electron at the anode. The proton separated at the anode is transmitted through a polymer electrolyte membrane to reach the cathode, while the electron separated at the anode runs through a connected electric circuit via a load to also reach the cathode. Oxygen included in the compressed air reacts with the proton and the electron to produce water at the cathode. This electrochemical reaction generates the electromotive force.

Referring to FIG. 2, the fuel cells 20 are located under the rear seat 17 in the passenger compartment to be stacked along a width of the vehicle. Here the terminology 'the fuel cells 20 are in the passenger compartment' means that the fuel cells 20 are accessible to be mountable and dismountable from the passenger compartment. The arrangement of the fuel cells 20 in the passenger compartment desirably reduces potential effects due to the contact of the fuel cells 20 with the outside air, compared with an externally accessible and mountable arrangement. The stacking of the fuel cells 20 along the width of the vehicle ensures the favorable weight balance over the width of the vehicle.

The auxiliary machinery unit 30 located on the side of the fuel cells 20 under the rear seat 17 includes the air compressor 13, the mass flow controller 22, the humidifier 23, a DC-DC converter 24 that lowers the output voltages from the fuel cells 20 and the secondary battery 40 to a preset voltage level and gives the supplies of electric power of the lowered voltage level to the air compressor 13 and to the mass flow controller 22, a hydrogen gas circulation pump 25 that recirculates the exhaust of non-reacted hydrogen gas discharged from the fuel cells 20 into the supply flow to the fuel cells 20, a water pump 26 that circulates the flow of cooling water in the fuel cells 20 to cool the fuel cells 20 down, the distributor 27 that distributes the outputs of the fuel cells 20 and the secondary battery 40, and the inverters 11a and 12a that respectively give supplies of the three-phase electric power to the left wheel motor 11 and to the right wheel motor 12. The distributor 27 is constructed as a switching circuit that supplies the required levels of electric power from either or both of the fuel cells 20 and the secondary battery 40 to the left wheel motor 11, the right wheel motor 12, and the diverse auxiliary machinery, while charging the secondary battery 40 with the electric power generated by the fuel cells 20 according to the requirements. The radiator 32 provided in the circulation flow path of cooling water for cooling the fuel cells 20 down is located at a position in a foremost part of the vehicle to be directly exposed to the outside air.

The hydrogen tanks 21 are located in the vicinity of a front axle of the left and right front wheels FWL and FWR in a front space 61 of the vehicle and are arranged to have their longitudinal axis along the width of the vehicle. The hydrogen tanks 21 are positioned at substantially the same height as a mounting height of a front bumper 64 functioning as a front shock absorbing member of the vehicle. The location of the hydrogen tanks 21 in the front space 61 of the vehicle desirably ensures sufficient spaces in a trunk room 62 on the rear side of the vehicle and in the passenger compartment of the vehicle. The arrangement of the hydrogen tanks 21 in the vicinity of the front axle of the left and right front wheels FWL and FWR enables the load of the hydrogen tanks 21 to be directly applied to the left and right front wheels FWL and FWR, thus desirably reducing the required weight of support members for supporting the hydrogen tanks 21. The layout of the hydrogen tanks 21 to have their longitudinal axis along the width of the vehicle gives the good weight balance over the width of the vehicle. The positioning of the hydrogen tanks 21 at substantially the same height as the mounting height of the front bumper 64 effectively reduces a potential shock to the hydrogen tanks 21 in the event of a vehicle collision.

The secondary battery 40 includes plurality of known nickel metal hydride cells connected in series and is located under the rear seat 17 in the passenger compartment. The secondary battery 40 under control of the PCU 50 supplies required levels of electric power to the left wheel motor 11 and the right wheel motor 12 at a start of the vehicle, while being charged with electric power regenerated by the left wheel motor 11 and the right wheel motor 12 in regenerative braking. The secondary battery 40 also supplements electric power to the left wheel motor 11 and the right wheel motor 12 in addition to the electric power generated by the fuel cells 20 in acceleration, while being charged with the electric power generated by the fuel cells 20 according to the requirements of the loading. The secondary battery 40 is not restricted to the nickel metal hydride battery but may be any chargeable and dischargeable battery, for example, a nickel cadmium battery, a lithium metal hydride battery, or a lead-acid battery, or a capacitor.

The PCU 50 is constructed as a microcomputer of a known structure including a CPU, a ROM, a RAM, and input and output ports (not shown) and is located above the hydrogen tanks 21 in the front section of the vehicle. The PCU 50 receives, via the input port, an accelerator pedal position detected by an accelerator pedal position sensor, phase currents of the left wheel motor 11 and the right wheel motor 12, a remaining state of charge of the secondary battery 40, and diversity of detection signals from various sensors (not shown). The PCU 50 drives and controls the left wheel motor 11 and the right wheel motor 12, while controlling the mass flow controller 22 and the air compressor 13 to regulate the supplies of the material gases, in response to these input signals.

As described above, in the fuel cell vehicle 10 of the embodiment, the hydrogen tanks 21 are located in the front space 61. This location ensures the sufficient spaces in the trunk room 62 on the rear side of the vehicle and in the passenger compartment. The arrangement of the hydrogen tanks 21 in the vicinity of the front axle of the left and right front wheels FWL and FWR enables the load of the hydrogen tanks 21 to be directly applied to the left and right front wheels FWL and FWR and thus desirably reduces the required weight of the support members for supporting the hydrogen tanks 21. The layout of the hydrogen tanks 21 to have their longitudinal axis along the width of the vehicle gives the good weight balance over the width of the vehicle. The positioning of the hydrogen tanks 21 at substantially the same height as the mounting height of the front bumper 64 effectively reduces a potential shock to the hydrogen tanks 21 in the event of a vehicle collision.

In the fuel cell vehicle 10 of the embodiment, the fuel cells 20 are located under the rear seat 17. This layout ensures the effective use of a potentially dead space in the passenger compartment. The arrangement of the fuel cells 20 to be accessible in the passenger compartment desirably reduces potential effects due to the contact of the fuel cells 20 with the outside air and thus ensures the operations of the fuel cell 20 under favorable conditions. The stacking of the fuel cells 20 along the width of the vehicle gives the favorable weight balance over the width of the vehicle.

In the fuel cell vehicle 10 of the embodiment, the secondary battery 40 is located under the front seat 14. This layout ensures the effective use of a potentially dead space in the passenger compartment.

In the fuel cell vehicle 10 of the embodiment, the auxiliary machinery unit 30 of the fuel cells 20 (including the mass flow controller 22, the humidifier 23, the DC-DC converter 24, the hydrogen gas circulation pump 25, the water pump 26, the distributor 27, and the inverters 11a and 12a) are located on the side of the fuel cells 20 under the rear seat 17. This arrangement desirably simplifies the gas piping layout, compared with separate arrangement of the auxiliary machinery unit 30 from the fuel cells 20. The fuel cells 20 and their auxiliary machinery unit 30 are arranged side by side under the rear seat 17 along the width of the vehicle, which corresponds to the longitudinal axis of the underspace of the rear seat 17.

In the fuel cell vehicle 10 of the embodiment, the fuel cells 20 and the secondary battery 40 are located above the floor level. This layout readily assures the required minimum ground level of the vehicle, compared with the layout of the fuel cells 20 and the secondary battery 40 located below the floor level.

In the event of a side collision, the center pillars 60, 60 formed upright on the left and right side faces of the fuel cell vehicle 10 to be located between the front seat 14 and the rear seat 17 receive a large part of the impact. The presence of the center pillars 60, 60 thus desirably protects the fuel cells 20 and the secondary battery 40 from the crash impact.

In the fuel cell vehicle 10 of the embodiment, the hydrogen tanks 21 are located above the front axle of the left and right front wheels FWL and FWR and are arranged to have their longitudinal axis along the width of the vehicle. In a modified structure, the hydrogen tanks 21 may be arranged to have their longitudinal axis along the length of the vehicle.

In the fuel cell vehicle 10 of the embodiment, the hydrogen tanks 21 are positioned at substantially the same height as the mounting height of the front bumper 64. It is, however, not essential that the position of the hydrogen tanks 21 is completely identical with the mounting height of the front bumper 64. The position of the hydrogen tanks 21 may partly overlap the mounting height of the front bumper 64 or may be completely different from the mounting height of the front bumper 64.

In the fuel cell vehicle 10 of the embodiment, the hydrogen tanks 21 are used as the source of the hydrogen gas (fuel gas) supplied to the fuel cells 20. The hydrogen tanks 21 may be replaced by a hydrogen storage alloy or by a reformer that produces hydrogen-rich gas through reaction of a hydrocarbon fuel (for example, gasoline or methanol) with water.

The fuel cell vehicle 10 of the embodiment has the two rows of seats in the passenger compartment aligned in the longitudinal axis of the vehicle. Three or a greater number of rows of seats may be provided in the passenger compartment of the vehicle. For example, in a vehicle with three rows of seats, when a seat in the front row is defined as the front seat, a seat in either the middle row or the rear row is set to the rear seat. When the seat in the middle row is defined as the front seat, on the other hand, the seat in the rear row is set to the rear seat. In the case where the rear seat is the seat in the rear row, it is not required to specify a rear boundary of a lower space of the rear seat. In the case where the rear seat is other than the seat in the rear row (for example, the seat in the middle row), however, it is desirable to specify the rear boundary of the lower space of the rear seat by a virtual vertical plane including a lower end of the seat back of the rear seat for the better riding comfortableness of the passengers seated on the seat in the rear row.

In the fuel cell vehicle 10 of the embodiment, the secondary battery 40 is located under the front seat 14, while the fuel cells 20 and the auxiliary machinery unit 30 are located under the rear seat 17. In one modified structure, the fuel cells 20 and the auxiliary machinery unit 30 maybe located under the front seat 14, while the secondary battery 40 may be located under the rear seat 17.

The auxiliary machinery unit 30 is located on the side of the fuel cells 20 under the rear seat 17 in the fuel cell vehicle 10 of the embodiment, but may alternatively be located in the trunk room 62.

In the fuel cell vehicle 10 of the embodiment, both the fuel cells 20 and the secondary battery 40 are used as the available power source of the left wheel motor 11 and the right wheel motor 12. (In this structure, the control may give the power supplies from both of the fuel cells 20 and the secondary battery 40 to the left wheel motor 11 and the right wheel motor 12 or may give the power supplies from only one of the fuel cells 20 and the secondary battery 40 to the left wheel motor 11 and the right wheel motor 12.) In one possible modification, only either one of the fuel cells 20 and the secondary battery 40 may be used as the available power source of the left wheel motor 11 and the right wheel motor 12. For example, one of the fuel cells 20 and the secondary battery 40 is used as the power source of the left wheel motor 11 and the right wheel motor 12, while the other is used as the power source of other equipment (for example, auxiliary machinery). Another modified structure has another power source for the left wheel motor 11 and the right wheel motor 12 in addition to the fuel cells 20 and the battery 40, and uses both or either one of the fuel cells 20 and the battery 40 to assist the additional power source. The left wheel motor 11 and the right wheel motor 12 are accordingly designed to use at least one of the fuel cells 20 and the secondary battery 40 as the available power source.

The fuel cell vehicle 10 of the embodiment is driven by the left wheel motor 11 and the right wheel motor 12, which are respectively built in the left front wheel FWL and the right front wheel FWR as the in-wheel motors. The fuel cell vehicle 10 of the embodiment may alternatively be designed to be driven by a single drive motor that outputs driving power via a differential gear to the front axle of the left front wheel FWL and the right front wheel FWR.

The embodiment discussed above regards the fuel cell vehicle 10 where the hydrogen tanks 21 for supplying hydrogen to the fuel cells 20 are located in the front space 61. The technique of the invention is generally applicable to a vehicle, where gaseous fuel tanks are located in a front space to give a supply of gaseous fuel to any of diverse power output apparatuses that receive the supply of gaseous fuel and output driving power.

The embodiment discussed above is to be considered in all aspects as illustrative and not restrictive. There may be many modifications, changes, and alterations without departing from the scope or spirit of the main characteristics of the present invention. All changes within the meaning and range of equivalency of the claims are intended to be embraced therein.

The invention claimed is:

1. A motor vehicle, comprising:
    a power output apparatus that receives a supply of hydrogen gas and outputs driving power;
    a shock absorbing member that is mounted on a foremost part of said vehicle to absorb impact of a front collision; and
    a hydrogen gas tank that is located above and has a central axis that is substantially aligned with a front axle of said vehicle to partly overlap a mounting height of the shock absorbing member and stores the hydrogen gas to be supplied to said power output apparatus.

2. A motor vehicle in accordance with claim 1, further comprising a radiator for cooling down said power apparatus located between the shock absorbing member and hydrogen gas tank.

3. A motor vehicle in accordance with claim 1, wherein said power output apparatus comprises fuel cells that receive the supply of hydrogen gas and generate electric power.

4. A motor vehicle in accordance with claim 3, wherein the fuel cells are located under a seat.

5. A motor vehicle in accordance with claim 4, wherein the fuel cells are located under a front seat and are stacked along a width of said vehicle, and
    said power output apparatus further comprises an accumulator that is located under a rear seat and is chargeable with the electric power generated by the fuel cells.

6. A motor vehicle in accordance with claim 4, wherein the fuel cells are located under a rear seat and are stacked along a width of said vehicle, and
    said power output apparatus further comprises an accumulator that is located under a front seat and is chargeable with the electric power generated by the fuel cells.

7. A motor vehicle, comprising:
    a shock absorbing member that is mounted on a foremost part of said vehicle to absorb impact of a front collision;
    a power output apparatus that receives a supply of hydrogen gas and outputs driving power;
    a hydrogen gas tank that is located above and has a central axis that is substantially aligned with a front axle of said vehicle to partly overlap a mounting height of the shock absorbing member and stores the hydrogen gas to be supplied to said power output apparatus.

8. A motor vehicle in accordance with claim 7, wherein said hydrogen gas tank is arranged to have its longitudinal axis along a width of said vehicle.

9. A motor vehicle in accordance with claim 7, wherein said hydrogen gas tank stores either hydrogen or a hydrogen-containing gas as the hydrogen gas.

10. A motor vehicle in accordance with claim 7, wherein said hydrogen gas tank is arranged to have its longitudinal axis along a width of said vehicle and stores either hydrogen or a hydrogen-containing gas as the hydrogen gas.

11. A motor vehicle in accordance with claim 7, wherein said power output apparatus comprises fuel cells that receive the supply of hydrogen gas and generate electric power.

12. A motor vehicle in accordance with claim 11, wherein the fuel cells are located in a passenger compartment of said vehicle.

13. A motor vehicle in accordance with claim 12, wherein the fuel cells are located under a seat.

14. A motor vehicle in accordance with claim 13, wherein the fuel cells are located under a front seat and are stacked along a width of said vehicle.

15. A motor vehicle in accordance with claim 14, wherein said power output apparatus further comprises an accumulator that is located under a rear seat and is chargeable with the electric power generated by the fuel cells.

16. A motor vehicle in accordance with claim 13, wherein the fuel cells are located under a rear seat and are stacked along a width of said vehicle.

17. A motor vehicle in accordance with claim 16, wherein said power output apparatus further comprises an accumulator that is located under a front seat and is chargeable with the electric power generated by the fuel cells.

18. A motor vehicle in accordance with claim 11, wherein said power output apparatus further comprises an accumulator that is chargeable with the electric power generated by the fuel cells.

19. A motor vehicle in accordance with claim 18, wherein the accumulator is located under a seat.

* * * * *